(12) United States Patent
Lee et al.

(10) Patent No.: US 8,775,114 B2
(45) Date of Patent: Jul. 8, 2014

(54) METHOD AND APPARATUS FOR DETERMINING PHASE SENSITIVITY OF AN ACCELEROMETER BASED ON AN ANALYSIS OF THE HARMONIC COMPONENTS OF THE INTERFERENCE SIGNAL

(75) Inventors: Yong Bong Lee, Daejeon (KR); Sung Soo Jung, Daejeon (KR); Seung-Woo Kim, Daejeon (KR)

(73) Assignees: Korea Research Institute of Standards and Science (KR); Korea Advanced Institute of Science and Technology (KR)

( * ) Notice: Subject to any disclaimer, the term of this patent is extended or adjusted under 35 U.S.C. 154(b) by 519 days.

(21) Appl. No.: 13/059,769

(22) PCT Filed: Aug. 22, 2008

(86) PCT No.: PCT/KR2008/004928
§ 371 (c)(1),
(2), (4) Date: May 9, 2011

(87) PCT Pub. No.: WO2010/021421
PCT Pub. Date: Feb. 25, 2010

(65) Prior Publication Data
US 2012/0059620 A1 Mar. 8, 2012

(30) Foreign Application Priority Data
Aug. 20, 2008 (KR) ........................ 10-2008-0081331

(51) Int. Cl.
*G01H 1/04* (2006.01)
*G01P 21/00* (2006.01)

(52) U.S. Cl.
CPC . *G01H 1/04* (2013.01); *G01P 21/00* (2013.01)
USPC ............ 702/141; 73/579; 73/662; 73/514.29; 310/312; 310/365; 310/366; 310/369

(58) Field of Classification Search
USPC .......................................... 702/141
See application file for complete search history.

(56) References Cited

U.S. PATENT DOCUMENTS

| | | | |
|---|---|---|---|
| 5,146,414 A * | 9/1992 | McKown et al. | 702/49 |
| 6,510,738 B1 * | 1/2003 | Lee et al. | 73/579 |
| 7,013,729 B2 * | 3/2006 | Knudsen et al. | 73/514.26 |
| 7,663,107 B2 * | 2/2010 | Taday | 250/339.11 |
| 7,961,777 B2 * | 6/2011 | Nakanishi et al. | 375/224 |
| 8,346,034 B2 * | 1/2013 | Hayakawa et al. | 385/18 |
| 2006/0192974 A1 * | 8/2006 | Li | 356/496 |
| 2012/0059620 A1 * | 3/2012 | Lee et al. | 702/141 |

OTHER PUBLICATIONS

International Search Report-PCT/KR2008/004928 dated May 1, 2009.

* cited by examiner

*Primary Examiner* — Tung S Lau
*Assistant Examiner* — Stephanie Chang
(74) *Attorney, Agent, or Firm* — Cantor Colburn LLP (57) ABSTRACT

A method and apparatus for determining phase sensitivity of an accelerometer based on an analysis of the harmonic components of the interference signal, which can estimate phase lags of an accelerometer through an analysis of the interference signal obtained using a single photo-detector when the accelerometer moves in sinusoidal motion with an initial phase of vibration. The method comprises the steps of obtaining an interference signal in a time domain generated from a signal reflected by an accelerometer and a fixed mirror using a single photo-detector; transforming the interference signal in the time domain into a signal in a frequency domain including a plurality of harmonic signals by Fourier transform; and determining the phase sensitivity of the accelerometer using initial phase of vibration displacement of the accelerometer, which is included in the interference signal in the frequency domain.

6 Claims, 10 Drawing Sheets

(a) inteferometer signal simulated when OPD is zero.

(b) inteferometer signal simulated when OPD is $\dfrac{\lambda}{16}$ (c) inteferometer signal simulated when OPD is $\dfrac{\lambda}{8}$

Figure 11

METHOD AND APPARATUS FOR DETERMINING PHASE SENSITIVITY OF AN ACCELEROMETER BASED ON AN ANALYSIS OF THE HARMONIC COMPONENTS OF THE INTERFERENCE SIGNAL

TECHNICAL FIELD

The present invention relates to a method and apparatus for determining phase sensitivity of an accelerometer based on an analysis of the harmonic components of the interference signal, and more particularly, to a method and apparatus for determining phase sensitivity of an accelerometer based on an analysis of the harmonic components of the interference signal, which can estimate phase lags of an accelerometer through an analysis of the interference signal obtained using a single photo-detector when the accelerometer moves in sinusoidal motion with an initial phase of vibration.

BACKGROUND ART

Vibration is accompanied with all moving objects. There are frequent occasions when the vibration is not considered in designing machinery and equipment, or a structure. Due to the undesirable vibration, troubles or malfunctions are occurred, and thus additional efforts are required for restriction of the vibration. In order to reduce the vibration, it is necessary to grasp a cause of generation of the vibration, a vibration transmission path, a dynamic characteristic of the structure and the like, and the measurement of vibration is an essential element in this process. A machine under operation is unavoidably accompanied by vibration, but it is possible to detect a change in state of the machine by monitoring vibration signals, and thus the measurement of vibration is performed for the purpose of preventing and maintaining damage to the machinery and equipment, or the structure. Recently, as the structures such as a bridge and a building become larger and machine parts becomes lighter, a frequency component of the vibration is extended to low and high frequency ranges.

As the necessity for the measurement of vibration over a wide frequency range with a high degree of accuracy is increased, calibration of a vibration transducer becomes accordingly more important. However, in order to accurately measure the vibration using an accelerometer, the response characteristics of the accelerometer with respect to external vibration should be known. The accelerometer is an apparatus that transforms external vibration into electrical output. If an electrical output ratio of the accelerometer and a magnitude of the vibration applied to the accelerometer are known, then an absolute magnitude of vibration signal can be accurately measured. This characteristic is the magnitude information of accelerometer sensitivity. There is phase lag between the vibration applied to the accelerometer and the electrical output from the accelerometer, and the phase lag is phase information of the sensitivity of the accelerometer. The phase and magnitude of the sensitivity of the accelerometer is a function of the frequency.

Figure 1:
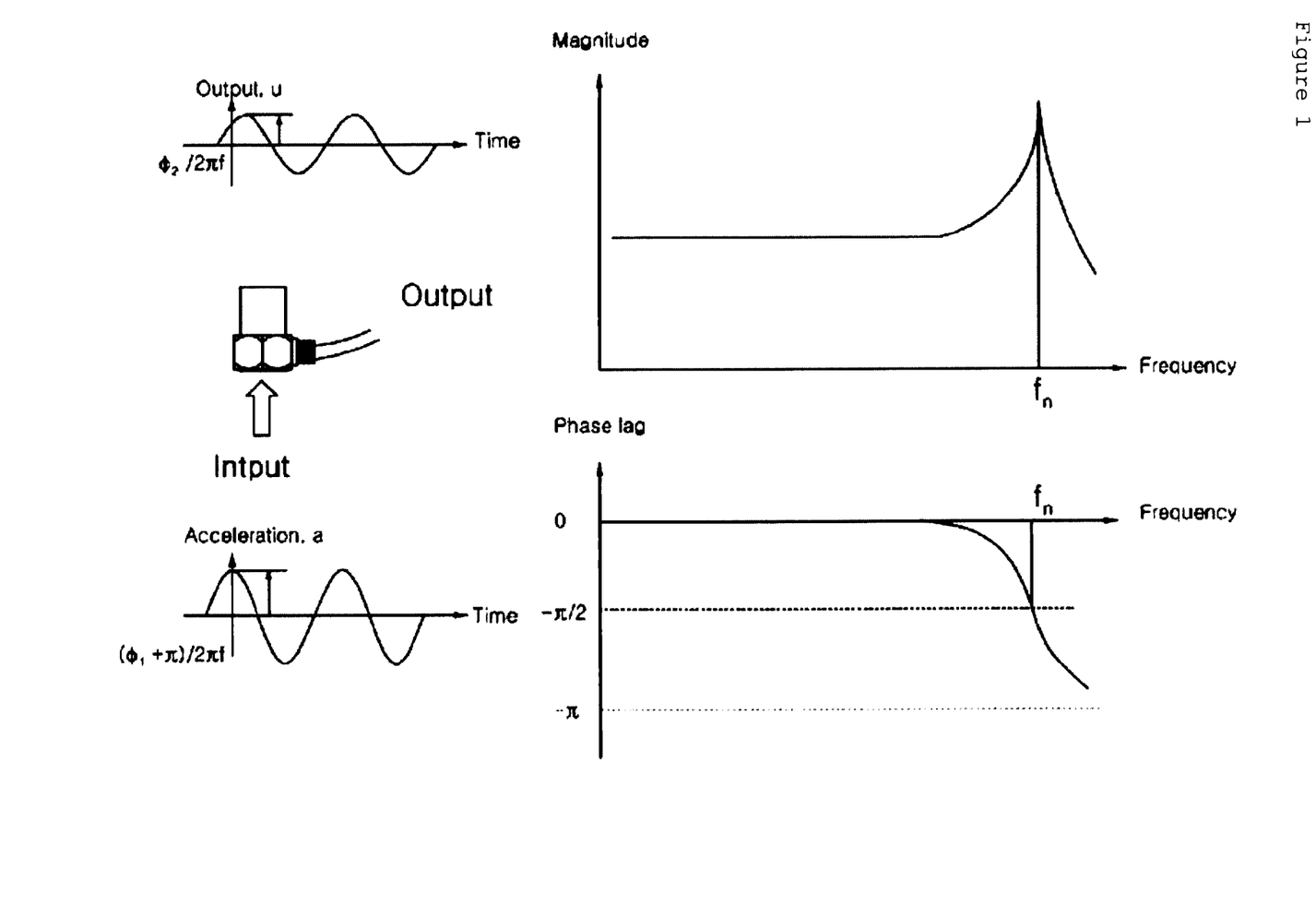
FIG. 1 is a graph showing phase sensitivity and magnitude of an accelerometer.

FIG. 1 shows the phase sensitivity and the magnitude of the accelerometer. The real vibration can be reconstructed completely from the measured signal with the magnitude and the phase information of the sensitivity of the accelerometer. The sensitivity of the accelerometer is defined as a ratio of the vibration applied to the accelerometer to the electrical output from the accelerometer. The sensitivity is a complex quantity having magnitude and phase and also a function of the frequency. Calibration of the accelerometer is a process of determining the sensitivity of the accelerometer. In order to calibrate the accelerometer through primary calibration by sinusoidal excitation, the accelerometer has to be excited by a sinusoidal motion. It is first necessary to apply vibration to the accelerometer. Sinusoidal vibration can be applied to the accelerometer using an electro-dynamic exciter. The vibration of the accelerometer and the electrical output from the accelerometer should then be measured during the sinusoidal motion of the accelerometer. The vibration of the accelerometer can be measured by various methods. However, it is known that the vibration of the accelerometer can be measured most accurately using a laser interferometer. The electrical output from the accelerometer can be measured using a digital voltmeter or a spectrum analyzer.

Several methods of analyzing the laser interferometer signal can be used to accurately determine the sensitivity of the accelerometer, including a Fringe counting method, a Fringe disappearance method, a harmonic components ratio method, a sine-approximation method and the like, but only the sine-approximation method can estimate the magnitude and the phase.

The sine-approximation method can calibrate the phase and the magnitude of the sensitivity in the frequency range of 1 Hz~10 kHz. Also, the sine-approximation method can be used to analyze the interference signal of a homodyne interferometer and a heterodyne interferometer.

The sine-approximation method with the homodyne interferometer should configure a Michelson interferometer having two quadrature signal outputs.

Figure 2:
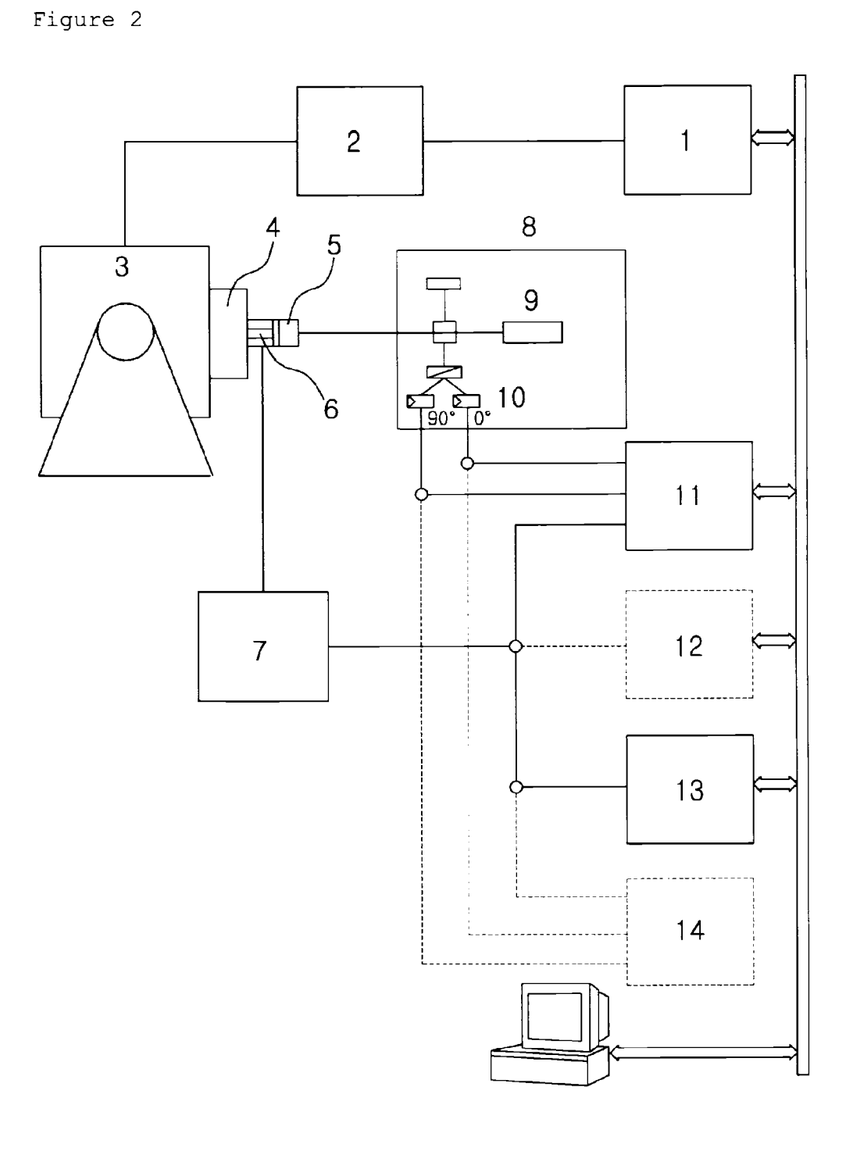
FIG. 2 is a schematic view showing a configuration of a measuring system using a conventional sine-approximation method for measuring the magnitude and phase at the same time.

FIG. 2 shows an entire configuration of a measuring system using the sine-approximation method. Referring to FIG. 2, the measuring system includes a frequency generator 1, a power amplifier 2, a vibrator 3, a moving part of vibrator 4, a dummy mass 5, an accelerator 6, an amplifier 7, an interferometer 8, a laser 9, a photo-detector 10, a digital waveform recorder 11, a voltmeter 12, a distortion meter 13 and an oscilloscope 14. Since a function of each element of the measuring system is well known, the description thereof will be omitted.

The measuring system with the sine-approximation method uses two photo-detectors 10. It is important that phase difference between the output signals measured from the interferometer through the photo-detector 10 is precisely 90°.

If the phase difference between the output signals of the two photo-detectors 10 is not precisely 90°, an error may be occurred in the estimation of the phase lag in the sine-approximation method. Particularly, when a vibration displacement is less than 0.5 μm, the error may become more than 0.3°. In order to mitigate this problem, the measurement error of the quadrature output signals should be corrected.

Also, the interferometer in the sine-approximation method has a more complicated configuration than those in other methods. For example, since the sine-approximation method uses the two photo-detectors 10, a quantity of light is reduced comparing with other methods using a single photo-detector, and a signal processing procedure is complicated.

When the vibration displacement is in a nanometer range, it is recommended that the heterodyne interferometer system should be employed. However, the heterodyne interferometer system is generally more complicated than the homodyne interferometer system with respect to its configuration, and thus the manufacturing cost is increased.

DISCLOSURE

Technical Problem

An object of the present invention is to provide a method of estimating phase lag of the accelerometer using a single photo-detector. The present invention employs the concept used in a method of calibrating the magnitude of the sensitivity of the accelerometer based on the harmonic components ratio method.

Heretofore, when analyzing a frequency spectrum of the signal of the photo-detector, the initial phase of the motion of the accelerometer is not considered. However, according to the present invention, first, a Fourier transform of the interference signal from a Michelson interferometer system is derived, where a moving mirror moves in sinusoidal motion with given amplitude and initial phase. Second, the phase lag of the accelerometer is estimated based on the Fourier transform.

Therefore, the present invention can estimate the phase lag of the accelerometer in a frequency range of 40 Hz~10 kHz.

Technical Solution

To achieve the above object, the present invention provides a method of determining phase sensitivity of an accelerometer based on an analysis of harmonic components of an interference signal, comprising the steps of obtaining an interference signal in a time domain generated from a signal reflected by an accelerometer and a fixed mirror using a single photo-detector; transforming the interference signal in the time domain into a signal in a frequency domain including a plurality of harmonic signals by Fourier transform; and determining the phase sensitivity of the accelerometer using initial phase of vibration displacement of the accelerometer, which is included in the interference signal in the frequency domain.

Preferably, the step of determining the phase sensitivity comprises the steps of obtaining an output phase of the accelerometer from a first harmonic component; determining a linear phase line using a harmonic order and a measured phase from each harmonic component; determining a linear phase from a phase of points in each harmonic order nearest to the linear phase line, and determining the initial phase of the vibration displacement by dividing the linear phase by the harmonic order and averaging the divided phase; and determining phase lag of the accelerometer from difference between the output phase and the initial phase.

Preferably, the step of determining the linear phase line comprises the steps of plotting points on a coordinate plane, which are apart form the measured phases by integer multiples of π; drawing an optional straight line that passes through an origin of the coordinate plane, and calculating a sum of squared effort (SSE) between the straight line and the nearest points; and repeating a process of calculating the SSE while a slop of the straight line is gradually increased step-wise, and determining the straight line having a minimum SSE as the linear phase line.

Preferably, the linear phase line can be expressed by a following equation, and the slop of the straight line exists between −π and π, and two linear phase lines and two initial phases corresponding to each linear line exist, and between the two initial phases, the true phase, whose phase difference with the output phase −π of the accelerometer is smaller than 90°, is determined as the initial phase.

Preferably, the method further comprises the step of determining magnitude sensitivity of the accelerometer.

Further, the present invention provides an apparatus for determining phase sensitivity of an accelerometer based on an analysis of harmonic components of an interference signal, comprising a single photo-detector for obtaining an interference signal in a time domain generated from signal reflected by an accelerometer and a fixed mirror using; a Fourier transformer for transforming the interference signal in the time domain into a signal in a frequency domain including a plurality of harmonic signals; and a phase and magnitude calibrator for determining the phase sensitivity of the accelerometer using initial phase of vibration displacement of the accelerometer, which is included in the interference signal in the frequency domain.

Preferably, the phase and magnitude calibrator obtains an output phase of the accelerometer from a first harmonic component, and determines a linear phase line using a harmonic order and a measured phase from each harmonic component, and determines a linear phase from a phase of points in each harmonic order nearest to the linear phase line, and determines the initial phase of the vibration displacement by dividing the linear phase by the harmonic order and averaging the divided phase, and determines phase lag of the accelerometer from difference between the output phase and the initial phase.

Preferably, the phase and magnitude calibrator determines magnitude sensitivity of the accelerometer together with the phase sensitivity of the accelerometer.

Furthermore, the present invention provides a computer-readable medium storing a program for executing at least one of the methods.

Advantageous Effects

The present invention can provides a new method of determining the phase lag of the accelerometer based on an analysis of the interference signal obtained using a single photo-detector. In other words, the present invention can accurately determine the phase lag of the accelerometer in a frequency range of 40 Hz~10 kHz.

Further, since the present invention uses a single photo-detector, it does not require any additional procedures to correct nonlinear errors, which are likely to arise in the conventional methods using two photo-detectors.

Further, since the present invention uses the homodyne interferometer system, it has a very simple construction. For example, a high-speed data acquisition system like a time interval analyzer is not required.

Further, the signal processing procedures used in the present invention are simple. Since it does not require other procedures except the Fourier transform, the possibility of generating errors is reduced.

Further, if the phase results measured by the present invention are applied to the valuation of the sensitivity magnitude of the accelerometer, it is possible to increase the resolution of analysis of a multi-valued function. The phase measurement method is also useful in evaluating a vibration measurement transducer having a relatively low resonant frequency.

DESCRIPTION OF DRAWINGS

The above and other objects, features and advantages of the present invention will become apparent from the following description of preferred embodiments given in conjunction with the accompanying drawings, in which.

BEST MODE

All technical and scientific terms used herein have the same meaning as commonly understood by one of ordinary skill in the art to which this invention belongs. However, several of the terms may not be generally understood, and general definitions of these terms are provided herein. While it is not intended that the present invention be restricted by shortcomings in these definitions, it is believed helpful to provide these definitions as guidance to those unfamiliar with the terms.

Hereinafter, the embodiments of the present invention will be described in detail with reference to accompanying drawings.

Figure 3:
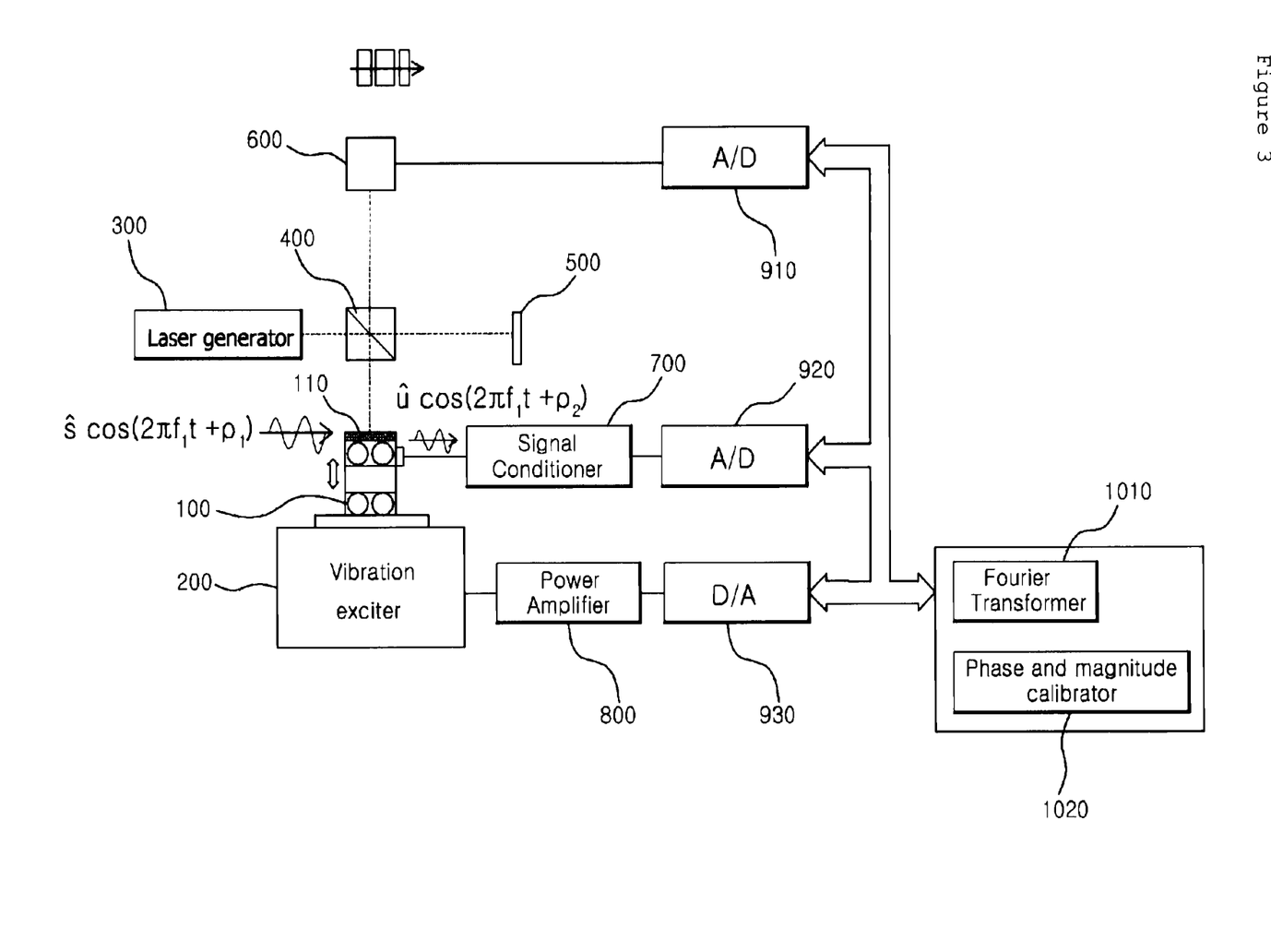
FIG. 3 is a block diagram showing an apparatus for determining phase sensitivity with a single photo-detector according to an embodiment of the present invention.

FIG. 3 shows an apparatus for determining phase sensitivity with a single photo-detector according to an embodiment of the present invention. Referring to FIG. 3, the apparatus for determining the phase sensitivity comprises an accelerometer 100, a vibration exciter 200, a laser generator 300, a beam splitter 400, a fixed mirror 500, a photo-detector 600, a signal conditioner 700, a power amplifier 800, an A/D converter 910, 920, a D/A converter 930, a Fourier transformer 1010 and a phase and magnitude calibrator 1020.

The vibration exciter 200 generates vibration having a given frequency, and the accelerometer 100 disposed at the vibration exciter 200 is vibrated at the given frequency. A laser beam generated from the laser generator 300 is split in the beam splitter 400, and a part of the laser beam (hereinafter, "first split laser beam") is reflected on the fixed mirror 500 and then incident again on the beam splitter 400, and other part of the laser beam (hereinafter, "second split laser beam") is reflected on an upper surface of the accelerometer 100 and then incident again on the beam splitter 400. The first and second split laser beams are incident to the photo-detector 600 via the beam splitter 400, and the photo-detector 600 measures interference signal of each first and second split laser beam.

The present invention estimates the sensitivity of phase and/or magnitude of the accelerometer 100 using the photo-detector 600. The interference signal is passed through the A/D converter 910 and then transformed into a signal having a frequency range at the Fourier transformer 1010. In the present invention, the Fourier transform method is used to transform the interference signal into the signal in a frequency domain. However, the present invention is not limited to the method, and may further include other transform methods of transforming the interference signal into the signal in the frequency domain. The phase and magnitude calibrator 1020 estimates the phase sensitivity and the magnitude sensitivity of the transformed interference signal.

Figure 4:
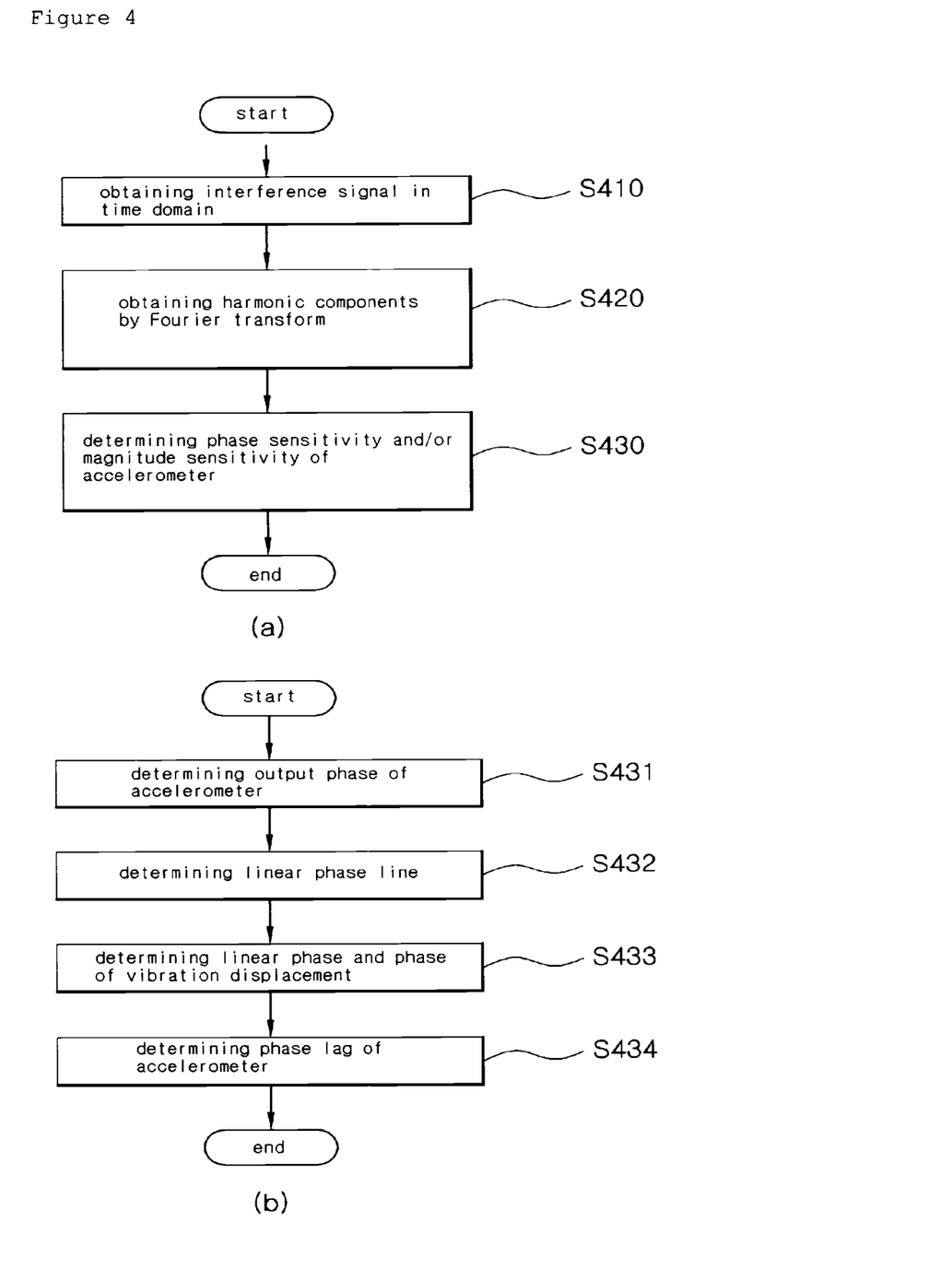
FIG. 4 is a flow chart showing a method of determining phase sensitivity and/or magnitude sensitivity of an accelerometer according to an embodiment of the present invention.

FIG. 4 is a flow chart showing a method of determining the phase sensitivity and/or magnitude sensitivity of the accelerometer according to an embodiment of the present invention. Referring to FIG. 4a, first, an interference signal in a time domain is obtained using the single photo-detector 600 (S410). As described above, the interference signal is generated from the signal reflected by the vibrated accelerometer 100 and fixed mirror 500.

Then, the interference signal is converted into a digital signal by the A/D converter 910 and transformed into the signal in the frequency domain by the Fourier transformer 1010, and harmonic components of the interference signal in the frequency domain is obtained (S420). And the phase and magnitude calibrator 1020 determines the phase sensitivity and/or the magnitude sensitivity of the accelerometer 100 using the harmonic components (S430). The present invention can determine the phase sensitivity and/or the magnitude sensitivity of the accelerometer 100 at the same time, or determine only the phase sensitivity of the accelerometer 100.

FIG. 4b is a flow chart showing a method of determining the phase sensitivity of the accelerometer. First, an output phase of the accelerometer 100 is determined (S431), a linear phase line is determined (S432), a linear phase and a vibration phase of the accelerometer are determined (S432), and a phase lag of the accelerometer 100 is determined (S433).

Now, the detailed description will be provided.

A moving mirror 110 is bonded on an upper surface of the accelerometer. The moving mirror 110 moved in a sinusoidal notion together with the accelerometer. The motion of the accelerometer can be defined by the following equation 1:

$$s = \hat{s}\cos(2\pi f_1 t + \phi_1) \qquad \text{[Equation 1]}$$

where S is a displacement in m, $\hat{S}$ is a magnitude of the displacement in m, $$f_1 = \frac{\omega_1}{2\pi}$$

is a frequency of vibration in Hz, $\omega_1$ is an angular frequency in rad/s, and $\phi_1$ is an initial phase of displacement in rad. The intensity of the interference signal measured by the photo-detector 600 can be defined by the following equation 2:

$$I(t) = A + B\cos\left[\frac{4\pi}{\lambda}\{\hat{s}\cos(2\pi f_1 t + \phi_1) + L\}\right] \qquad \text{[Equation 2]}$$

where $\lambda$ is a wavelength of the laser beam in m, L is an optical path length difference in m and A, B are constants. A generating function for Bessel functions in series form can be expressed by the following equation 3:

$$\exp\left[j\frac{\hat{x}}{2}\left(v - \frac{1}{v}\right)\right] = \sum_{n=-\infty}^{\infty} J_n(\hat{x})v^n \qquad \text{[Equation 3]}$$

where $J_n$ is a nth-order Bessel function. Variables in the equation 3 can be expressed by the following equations 4 and 5:

$$\hat{x} = \frac{4\pi \hat{s}}{\lambda} \qquad \text{[Equation 4]}$$

$$v = \exp[j(2\pi f_1 t + \phi_1)] \qquad \text{[Equation 5]}$$

If the equations 3 to 5 are substituted in the equation 2, the intensity can be expressed by the following equation 6:

$$I(t) = A + \qquad \text{[Equation 6]}$$
$$B \sum_{n=-\infty}^{\infty} J_n\left(\frac{4\pi \hat{s}}{\lambda}\right) \cos\left(\frac{4\pi L}{\lambda} + \frac{n}{2}\pi\right) \times \exp(jn\phi_1)\exp(j2\pi n f_1 t)$$

The Fourier transform of the equation 6 becomes as follows:

$$I(f) = A\delta(f) + \qquad \text{[Equation 7]}$$
$$B \sum_{n=-\infty}^{\infty} J_n\left(\frac{4\pi \hat{s}}{\lambda}\right) \cos\left(\frac{n}{2}\pi + \frac{4\pi L}{\lambda}\right) \times \exp(jn\phi_1)\delta(f - nf_1)$$

If the equation 7 is decomposed into even and odd terms, it can be expressed by the following equation 8:

$$I(f) = A\delta(f) + B\cos\left(\frac{4\pi L}{\lambda}\right) \qquad \text{[Equation 8]}$$
$$\sum_{m=-\infty}^{\infty} (-1)^m J_{2m}\left(\frac{4\pi \hat{s}}{\lambda}\right) \times \exp(j2m\phi_1)\delta(f - 2mf_1) +$$
$$B\sin\left(\frac{4\pi L}{\lambda}\right) \sum_{m=-\infty}^{\infty} (-1)^m J_{2m-1}\left(\frac{4\pi \hat{s}}{\lambda}\right) \times$$
$$\exp[j(2m-1)\phi_1]\delta\{f - (2m-1)f_1\}$$

where $\delta(\ )$ is a delta function, $$J_n\left(\frac{4\pi \hat{s}}{\lambda}\right)$$

is the nth-Bessel function, and n, m are integers. Equations 7 and 8 show that the displacement amplitude appears at the magnitude of the spectrum of the interference signal and the initial phase of the sinusoidal displacement appears at the phase component of the spectrum, respectively.

Hereinafter, properties of the spectrum of the interference signal will be described.

The equation 7 indicates that the spectrum of the interference signal consists of infinite harmonic components having an exciting frequency as fundamental frequency. However, even or odd harmonic components may appear dominantly according to the magnitude of the optical path length difference.

The equation 8 shows that the even harmonic components only appear when $$L = \frac{\lambda}{4}k, k = 0, \pm 1, \pm 2, \ldots ,$$

and the odd harmonic components only appear when $$L = \frac{\lambda}{4}k + \frac{\lambda}{8}, k = 0, \pm 1, \pm 2, \ldots .$$

For example, when the optical path length difference is changed by $$\frac{\lambda}{8}$$

in a test, the Fourier transform of the interference signal measured at this time shows that the even and odd harmonic components appear alternately.

Figure 5:
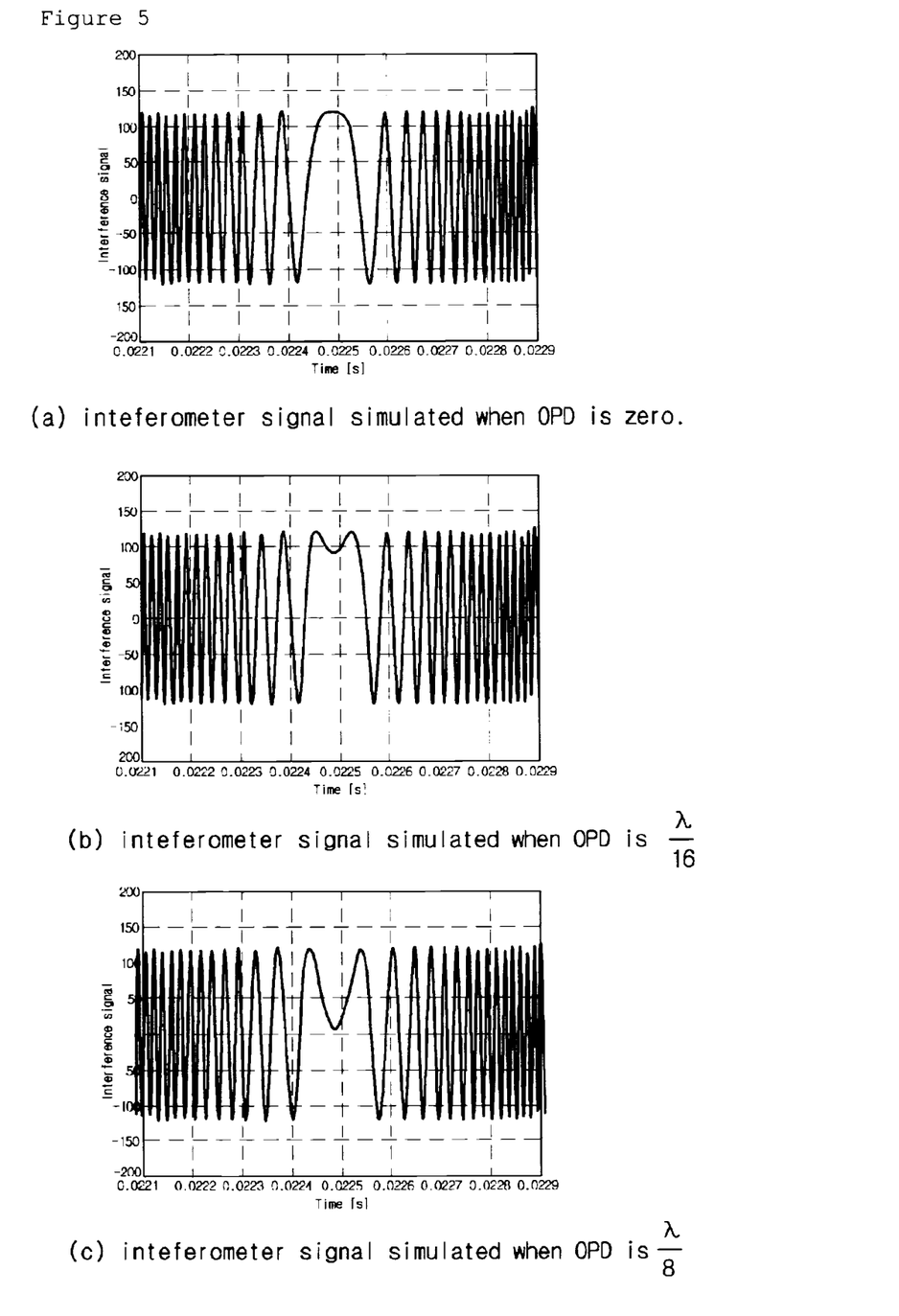
FIG. 5 is a graph showing interference signal generated in an interferometer when vibration having an optional initial phase is applied according to an embodiment of the present invention.

FIG. 5 shows simulation results of change in the interference signal generated from the interferometer, when vibration having an optional initial phase is applied at a frequency of 40 Hz and an acceleration of 50 m/s$^2$, in the case that the optical path length difference is increased stepwise by $$\frac{\lambda}{16}$$

each time from zero, wherein FIG. 5a shows that the even harmonic components only appear in the case that the optical path length difference is zero, FIG. 5b shows that the even and odd harmonic components appear all together and FIG. 5c shows that the odd harmonic components only appear. These processes are repeated, and then the interference signal that is identical with the original one is obtained when the optical path length difference is $$\frac{\lambda}{2}.$$

Bessel functions appear in each term of the equation 7 with the exception of the DC term. In addition, the argument of the Bessel function, $$\frac{4\pi \hat{s}}{\lambda},$$

is directly proportional to the amplitude of the sinusoidal displacement $\hat{s}$.

If the amplitude of the displacement becomes small, the argument of the Bessel function, $$\frac{4\pi \hat{s}}{\lambda},$$

will also become small.

Figure 6:
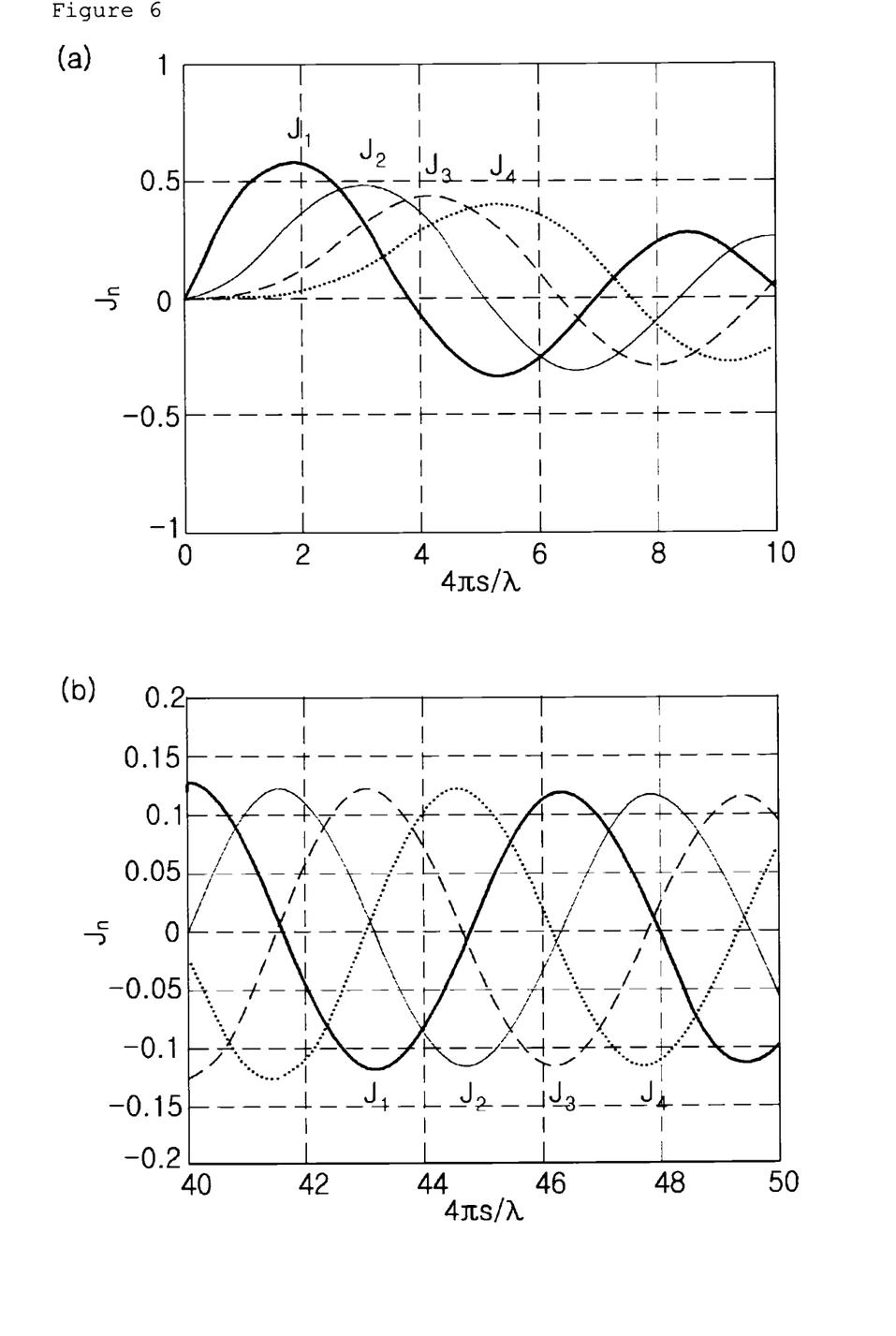
FIG. 6 is a graph showing a magnitude of harmonic component when an argument of Bessel function has a small value or a large value according to an embodiment of the present invention.

FIG. 6a shows that the harmonic components of few lower orders have a relatively large magnitude in the region that $$\frac{4\pi\hat{s}}{\lambda}$$

is small, and FIG. 6b the harmonic components have the same magnitude in the region that $$\frac{4\pi\hat{s}}{\lambda}$$

is large. The equation 7 shows that the interference signal spectrum has the harmonic components having the relatively large magnitude in the few lower orders.

As the amplitude of the displacement increases, the argument of the Bessel function increases. In this range, the Bessel functions can be approximated as the following equation 9:

$$J_n(x) \approx \sqrt{\frac{2}{\pi x}} \cos\left(x - \frac{n\pi}{2} - \frac{\pi}{4}\right) \qquad \text{[Equation 9]}$$

If the equation 9 is substituted into the equation 8 and the even and odd terms are given as $I_{2m}, I_{2m-1}$, it can be expressed by the following equations 10 and 11.

$$I_{2m} = B\cos\left(\frac{4\pi L}{\lambda}\right)\sqrt{\frac{\lambda}{2\pi^2\hat{s}}}\cos\left(\frac{4\pi\hat{s}}{\lambda} - \frac{\pi}{4}\right)\exp(j2m\phi_1) \qquad \text{[Equation 10]}$$

$$I_{2m-1} = B\cos\left(\frac{4\pi L}{\lambda}\right)\sqrt{\frac{\lambda}{2\pi^2\hat{s}}}\sin\left(\frac{4\pi\hat{s}}{\lambda} - \frac{\pi}{4}\right)\exp[j(2m-1)\phi_1] \qquad \text{[Equation 11]}$$

The equations 10 and 11 show that all even and odd harmonic components have the same magnitude independent of their harmonic order, if the vibration displacement $\hat{s}$ or the acceleration $$\hat{a}_{rms} = \frac{\hat{s}\omega_1^2}{\sqrt{2}}$$

corresponding to the displacement is given.

In the equations 10 and 11, if $$\hat{s} = \frac{\lambda}{16} + \frac{\lambda}{4}k, k = 0, 1, 2, \ldots,$$

only even harmonic spectrum components exist. And if $$\hat{s} = \frac{3\lambda}{16} + \frac{\lambda}{4}k, k = 0, 1, 2, \ldots,$$

only odd harmonic spectrum components exist.

That is, if $$\hat{s} = \frac{\lambda}{16} + \frac{\lambda}{8}k, k = 0, 1, 2, \ldots,$$

only the even or odd harmonic spectrum components exist. In addition, whenever the displacement $\hat{s}$ is increased, the even and odd harmonic spectrum components appear alternately. An acceleration increment $\Delta\hat{a}_{rms}$ corresponding to a displacement increment can be calculated by the following equation 12:

$$\Delta\hat{a}_{rms} = \frac{\pi^2\lambda}{2\sqrt{2}} f_1^2 \qquad \text{[Equation 12]}$$

where $f_1$ is a vibration frequency in Hz. From the equation 12, it can be understood that the acceleration increment that the even and odd harmonic spectrum components appear alternately is changed according to the vibration frequency. The acceleration increments calculated by the equation are 0.00353 m/s² at a frequency of 40 Hz, 0.0141 m/s² at a frequency of 80 Hz, 0.0565 m/s² at a frequency of 160 Hz, 0.219 m/s² at a frequency of 315 Hz, 0.876 m/s² at a frequency of 630 Hz, 3.45 m/s² at a frequency of 1.25 kHz, 13.8 m/s² at a frequency of 2.5 kHz and the like. Thus, it can be understood that, as the vibration frequency increases, the acceleration increment increases. Whenever the acceleration is changed by a value calculated at each frequency, the even and odd harmonic spectrum components appear alternately. As the testing frequency is reduced, the change of the even and odd harmonic spectrum components is increased if the acceleration is changed only a little. For example, in the spectrum of the interference signal that the even harmonic components appeared dominantly, the two components may appear at the same time, or the odd harmonic components may appear dominantly.

Figure 7:
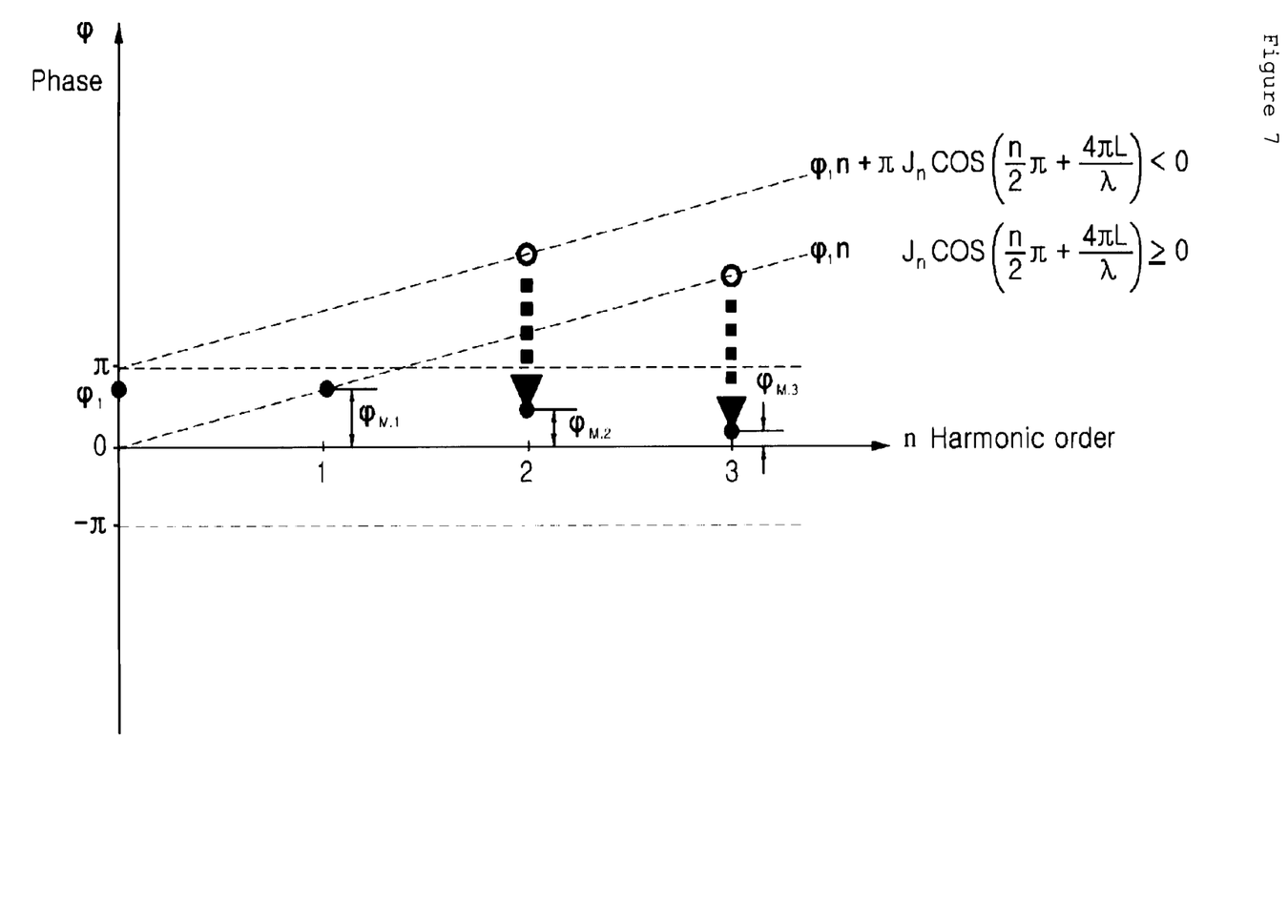
FIG. 7 is a graph showing a relation between a phase of the vibration displacement and a measured phase according to an embodiment of the present invention.

In the equation 7, if a phase of the vibration displacement $\phi_1$ is given, the phase of the spectrum of the interference signal becomes $n\phi_1$ if the sign of $$J_n\left(\frac{4\pi\hat{s}}{\lambda}\right)\cos\left(\frac{n}{2}\pi + \frac{4\pi L}{\lambda}\right)$$

is positive, or $n\phi_1 + \pi$ if the sign of $$J_n\left(\frac{4\pi\hat{s}}{\lambda}\right)\cos\left(\frac{n}{2}\pi + \frac{4\pi L}{\lambda}\right)$$

is negative. The measured phases $\phi_{M,n}$ in each harmonic order are given as principal values. FIG. 7 shows a relation between the vibration phase $\phi_1$ and the measured phase $\phi_{M,n}$. In the following, procedures to find the phase $n\phi_1$ from the measured phase $\phi_{M,n}$ and then find the phase of the vibration displacement $\phi_1$ and the phase of the acceleration $\phi_1 - \pi$ from the result will be described.

The method of determining the phase sensitivity of the accelerometer is as follows:

First, an output phase of the accelerometer is determined. The output phase $\phi_2$ can be obtained by its Fourier transform and by measuring the phase of the first harmonic component. If π is subtracted from the measured value, the output phase corresponding to the displacement signal can be obtained.

Second, a linear phase line is determined. From the equation 7, the linear phase $\phi_L$ is defined as a function of the harmonic order n by the following equation 13:

$$\phi_L = \phi_1 \cdot n \quad \text{[Equation 13]}$$

where n is an integer. In the equation 13, the harmonic order n is directly proportional to the linear phase $\phi_L$. If the equation 13 having n and $\phi_L$ as an independent variable and a dependent variable are plotted on a coordinate plane, a straight line that passes through the origin and has the phase $\phi_1$ of the sinusoidal displacement as a slope can be obtained.

The straight line is defined as the linear phase line.

Figure 8:
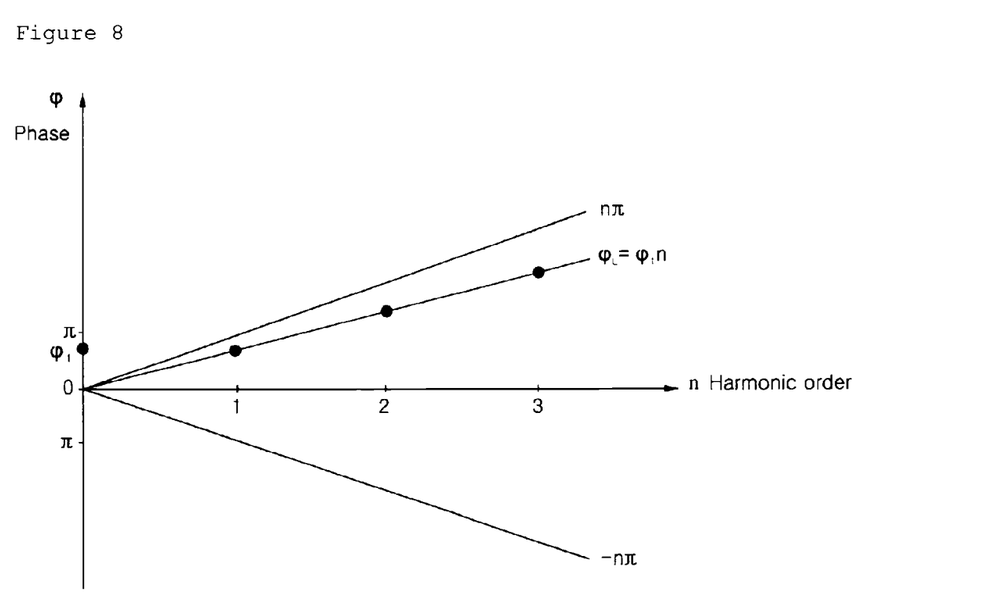
FIG. 8 is a graph showing a linear phase line according to an embodiment of the present invention.

Since the initial phase $\phi_1$ of the vibration displacement is a value that exists between −π and π, the linear phase line also exists between two straight lines, $\phi = \pm \pi n$, as shown in FIG. 8.

The measured phases $\phi_{M,n}$ are given as principal values that are exist between −π and π. The linear phase $\phi_L$ has to exist somewhere apart form the measured phases $\phi_{M,n}$ by integer multiples of π. All possible points for the linear phase can be shown on the coordinate plane. The linear phase line is the straight line that passes the origin and has to exist between two straight lines $\phi = \pm \pi n$.

Figure 9:
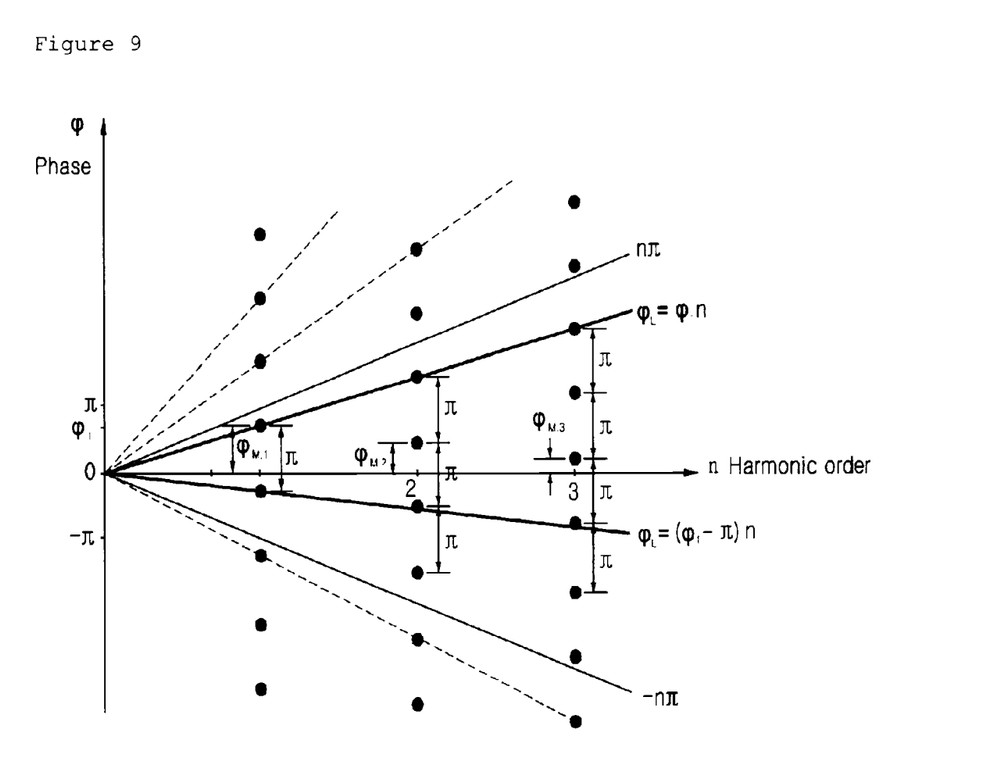
FIG. 9 is a graph showing that the linear phase line is expressed by a linear equation ($\phi_1+m\pi$)n according to an embodiment of the present invention.

FIG. 9 shows that the linear phase line can be expressed by $(\phi_1 + m\pi)n$, where $m = 0, \pm 1, \pm 2, \ldots$. Since the linear equation has to exist between two straight lines $\phi = \pm \pi n$, $-\pi \le \phi_1 + m\pi \le \pi$ can be obtained, and m can be expressed by the following equation 14:

$$-\frac{1}{\pi}\phi_1 - 1 \le m \le -\frac{1}{\pi}\phi_1 + 1 \quad \text{[Equation 14]}$$

where $-\pi \le \phi_1 \le \pi$ can be obtained, since the initial phase is given as the principal value.

Figure 10:
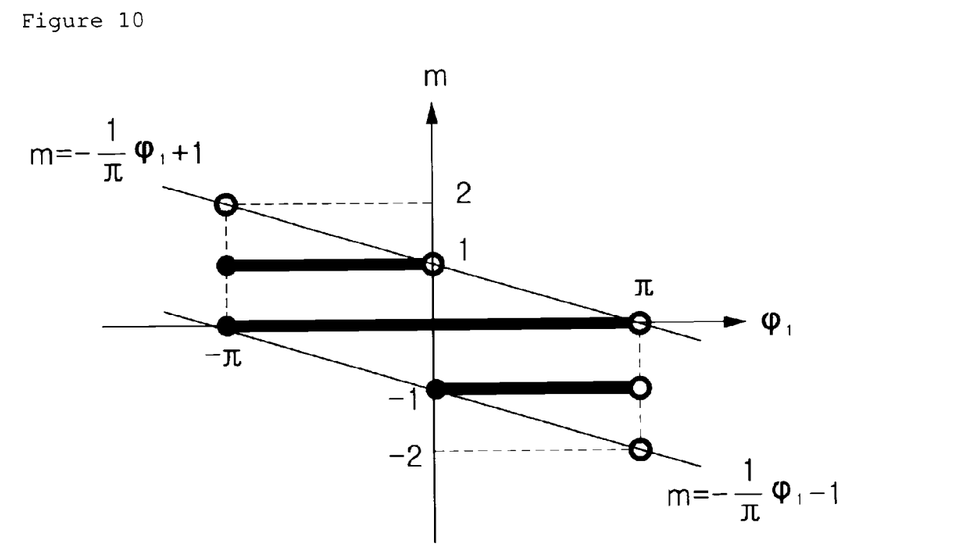
FIG. 10 is a graph showing that the linear phase line indicates a range of m in the linear equation ($\phi_1+m\pi$)n according to an embodiment of the present invention.

FIG. 10 shows the equation 14. In FIG. 10, it can be understood that m has values of 0 and −1, or 0 and 1 if the initial phase $\phi_1$ is given. If $0 \le \phi_1$, m has values of 0 and −1, and if $\phi_1 < 0$, m has values of 0 and 1. Two straight lines exist that fulfill this condition and they have a difference in slope of π from each other. FIG. 9 is a graph in the case of $0 \le \phi_1$.

In order to obtain these straight lines from test data, an optional line that passes through the origin is drawn, and then a sum of squared effort (SSE) between the straight line and the nearest points is calculated. After the process is repeated while the slop of the straight line is gradually increased stepwise from −π to π, the straight line having the minimum SSE is the linear phase line. The SSE will be zero in an ideal case.

Third, the liner phase $\phi_L$ and the phase $\phi_1$ of the vibration displacement are determined.

If points (in theory, points on the linear line) in each harmonic order nearest to the linear phase line is determined, the phase at every harmonic order corresponding to the points becomes the linear phase $\phi_L$. The phase at each harmonic order can be determined by dividing this linear phase by its harmonic order n, and then the initial phase $\phi_1$ of the sinusoidal displacement at each harmonic order can be determined by averaging the phase.

Figure 11:
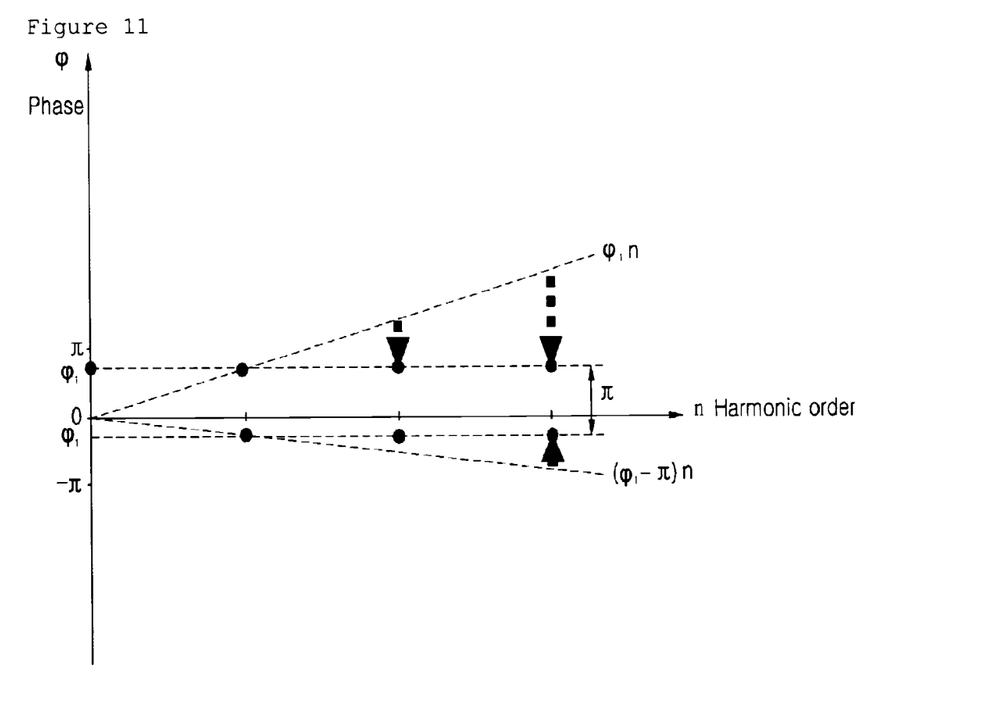
FIG. 11 is a graph showing a method of determining the phase of the vibration displacement according to an embodiment of the present invention.

FIG. 11 shows the method of determining the initial phase $\phi_1$ of the sinusoidal displacement. Since two linear phase lines exist, two displacement phases $\phi_1$ exist. Between the two displacement phases, it can select as the displacement phase $\phi_1$ the true phase whose phase difference with phase $\phi_2 − π$ obtained by twice integrating the output signal of the accelerometer is smaller than 90°.

The reason for the determination as described above is as follows. In general, an accelerometer is used in a frequency range lower than the natural frequency and calibrated in this frequency range. For example, the tested accelerometer has a natural frequency of about 40 kHz and a calibration range of 40 Hz to 10 Hz, which are significantly lower than the natural frequency of the accelerometer. The phase lag between the input and output of the system is physically smaller than 90° in a frequency range lower than the natural frequency of the system. Therefore, if the test is performed in a frequency range that is sufficiently smaller than the natural frequency, the phase lag between the sinusoidal acceleration input to the accelerometer and the output voltage of the accelerometer, or between the displacement phase input to the accelerometer and the signal obtained by twice integrating the output of the accelerometer has a value that is smaller than 90°, i.e., near 0°. Reversely, the phase lag has a value that is larger than 90° in the frequency range higher than the natural frequency.

The phase $\phi_1$ of the sinusoidal displacement can be determined from the measured phases $\phi_{M,n}$ in this way.

Fourth, the phase lag of the accelerometer is determined.

The phase lag of the accelerometer can be determined from the difference between the phase of the accelerometer output $\phi_2$ and the initial phase $\phi_1 − π$ of the acceleration applied to the accelerometer.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

For example, the present invention can be used to determine the phase lag of transducers for measuring linear vibration, such as a speed transducer and a displacement transducer, and transducers for measuring rotational vibration, such as an angular accelerometer, an angular sensor and an angular displacement sensor, using the laser interferometer. In the same manner, the present invention can be also used to determine the phase properties of a microphone or a hydrophone using the laser interferometer.

INDUSTRIAL APPLICABILITY

According to the present invention, it is possible to provide a new method of determining the phase lag of the accelerometer based on an analysis of the interference signal obtained using a single photo-detector. In other words, the present invention can accurately determine the phase lag of the accelerometer in a frequency range of 40 Hz~10 kHz.

Further, if the phase results measured by the present invention are applied to the valuation of the sensitivity magnitude of the accelerometer, it is possible to increase the resolution of analysis of a multi-valued function. The phase measurement method is also useful in evaluating a vibration measurement transducer having a relatively low resonant frequency.

The invention claimed is:

1. A method of determining phase sensitivity of an accelerometer based on an analysis of harmonic components of an interference signal, comprising the steps of:
obtaining an interference signal in a time domain generated from a signal reflected by an accelerometer and a fixed mirror using a single photo-detector;
transforming the interference signal in the time domain into a signal in a frequency domain including a plurality of harmonic signals by Fourier transform; and determining the phase sensitivity of the accelerometer using initial phase of vibration displacement of the accelerometer, which is included in the interference signal in the frequency domain, wherein the step of determining the phase sensitivity comprises the steps of: obtaining an output phase of the accelerometer from a first harmonic component; determining a linear phase line using a harmonic order and a measured phase from each harmonic component; determining a linear phase from a phase of points in each harmonic order nearest to the linear phase line, and determining the initial phase of the vibration displacement by dividing the linear phase by the harmonic order and averaging the divided phase; and determining phase lag of the accelerometer from difference between the output phase and the initial phase;

wherein the step of determining the linear phase line comprises the steps of: plotting points on a coordinate plane, which are apart from the measured phases by integer multiples of $\pi$; drawing an optional straight line that passes through an origin of the coordinate plane, and calculating a sum of squared effort (SSE) between the straight line and the nearest points; and repeating a process of calculating the SSE while a slop of the straight line is gradually increased stepwise, and determining the straight line having a minimum SSE as the linear phase line; and wherein the linear phase line can be expressed by a following equation, and the slop of the straight line exists between $-\pi$ and $\pi$, $$\phi_L = (\phi_1 + m\pi)n \qquad \text{[Equation]}$$

where $\phi_L$ is the linear phase line, $\phi_1$ is the initial phase, n is harmonic order, and m=0, ±1, ±2, . . . .

2. A method of determining phase sensitivity of an accelerometer based on an analysis of harmonic components of an interference signal, comprising the steps of:

obtaining an interference signal in a time domain generated from a signal reflected by an accelerometer and a fixed mirror using a single photo-detector;

transforming the interference signal in the time domain into a signal in a frequency domain including a plurality of harmonic signals by Fourier transform; and determining the phase sensitivity of the accelerometer using initial phase of vibration displacement of the accelerometer, which is included in the interference signal in the frequency domain, wherein the step of determining the phase sensitivity comprises the steps of: obtaining an output phase of the accelerometer from a first harmonic component; determining a linear phase line using a harmonic order and a measured phase from each harmonic component; determining a linear phase from a phase of points in each harmonic order nearest to the linear phase line, and determining the initial phase of the vibration displacement by dividing the linear phase by the harmonic order and averaging the divided phase; and determining phase lag of the accelerometer from difference between the output phase and the initial phase; and wherein two linear phase lines and two initial phases corresponding to each linear line exist, and between the two initial phases, the true phase, whose phase difference with the output phase $-\pi$ of the accelerometer is smaller than 90°, is determined as the initial phase.

3. The method according to claim 1, further comprising the step of determining magnitude sensitivity of the accelerometer.

4. An apparatus using the method according to claim 1, comprising:

a single photo-detector for obtaining an interference signal in a time domain generated from signal reflected by an accelerometer and a fixed mirror using;

a Fourier transformer for transforming the interference signal in the time domain into a signal in a frequency domain including a plurality of harmonic signals; and a phase and magnitude calibrator for determining the phase sensitivity of the accelerometer using initial phase of vibration displacement of the accelerometer, which is included in the interference signal in the frequency domain.

5. The apparatus according to claim 4, wherein the phase and magnitude calibrator obtains an output phase of the accelerometer from a first harmonic component, determines a linear phase line using a harmonic order and a measured phase from each harmonic component, determines a linear phase from a phase of points in each harmonic order nearest to the linear phase line, determines the initial phase of the vibration displacement by dividing the linear phase by the harmonic order and then by averaging the divided linear phase, determines phase lag of the accelerometer from difference between the output phase and the initial phase.

6. The apparatus according to claim 4, wherein the phase and magnitude calibrator determines magnitude sensitivity of the accelerometer together with the phase sensitivity of the accelerometer.

* * * * *